(12) United States Patent
Langereis et al.

(10) Patent No.: US 10,349,439 B2
(45) Date of Patent: Jul. 9, 2019

(54) RELEASE OF SEMI-PERSISTENT SCHEDULING

(71) Applicant: Telefonaktiebolaget LM Ericsson (publ), Stockholm (SE)

(72) Inventors: Alexander Langereis, Sigtuna (SE); Saad Naveed Ahmed, Solna (SE); Don Corry, Stockholm (SE); David Sandberg, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 15/107,350

(22) PCT Filed: Jan. 23, 2014

(86) PCT No.: PCT/SE2014/050079
§ 371 (c)(1),
(2) Date: Jun. 22, 2016

(87) PCT Pub. No.: WO2015/112063
PCT Pub. Date: Jul. 30, 2015

(65) Prior Publication Data
US 2017/0027018 A1    Jan. 26, 2017

(51) Int. Cl.
*H04W 72/14* (2009.01)
*H04W 76/38* (2018.01)
(Continued)

(52) U.S. Cl.
CPC ....... *H04W 72/14* (2013.01); *H04W 28/0278* (2013.01); *H04W 72/042* (2013.01);
(Continued)

(58) Field of Classification Search
CPC ... H04W 72/042; H04W 72/14; H04W 76/38; H04W 28/0278; H04W 72/0413; H04W 72/1284; H04M 7/006
See application file for complete search history.

(56) References Cited

U.S. PATENT DOCUMENTS 9,451,610 B2 *  9/2016  Ohta ................. H04W 72/1263
9,647,741 B2     5/2017  Zhang et al.
(Continued)

FOREIGN PATENT DOCUMENTS

CN   101835271 A    9/2010
CN   102549938 A    7/2012
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 10)", Technical Specification, 3GPP TS 36.213 V10.3.0, Sep. 1, 2011, pp. 1-122, 3GPP, France.
(Continued)

*Primary Examiner* — Christopher P Grey
(74) *Attorney, Agent, or Firm* — Sage Patent Group

(57) ABSTRACT

It is presented a method for releasing semi-persistent scheduling, SPS, for a wireless device. The method is performed in a network node and comprising the steps of: transmitting an SPS release message to the wireless device to release uplink SPS; starting a timer; when a first condition is true, transmitting a grant for uplink transmission to the wireless device, the first condition being true when the timer expires and/or a scheduling request has been received from the wireless device; receiving a data type indication from the wireless device; and determining that an SPS release message has been correctly received by the wireless device when a scheduling request has been received from the
(Continued)

wireless device, the grant has been transmitted and the data type indication indicates only voice over internet protocol, VoIP, data from the wireless device.

18 Claims, 4 Drawing Sheets

(51) Int. Cl.
*H04W 28/02* (2009.01)
*H04W 72/04* (2009.01)
*H04W 72/12* (2009.01)
*H04M 7/00* (2006.01)

(52) U.S. Cl.
CPC ............ *H04W 76/38* (2018.02); *H04M 7/006* (2013.01); *H04W 72/0413* (2013.01); *H04W 72/1284* (2013.01)

(56) References Cited

U.S. PATENT DOCUMENTS

| | | | |
|---|---|---|---|
| 2009/0154417 A1* | 6/2009 | Wu | H04W 72/042 |
| | | | 370/329 |
| 2010/0111026 A1* | 5/2010 | Hsu | H04L 1/1893 |
| | | | 370/329 |
| 2010/0151874 A1 | 6/2010 | Cai et al. | |
| 2010/0195629 A1 | 8/2010 | Chen et al. | |
| 2011/0032924 A1* | 2/2011 | Lee | H04W 76/28 |
| | | | 370/345 |
| 2011/0038339 A1* | 2/2011 | Zhang | H04W 72/1242 |
| | | | 370/329 |
| 2011/0039568 A1* | 2/2011 | Zhang | H04W 52/50 |
| | | | 455/452.1 |
| 2012/0320805 A1 | 12/2012 | Yang et al. | |
| 2013/0100936 A1* | 4/2013 | Pettersson | H04W 72/0446 |
| | | | 370/336 |
| 2015/0009874 A1* | 1/2015 | Edara | H04W 52/0225 |
| | | | 370/311 |
| 2015/0043365 A1* | 2/2015 | Park | H04W 52/0238 |
| | | | 370/252 |
| 2017/0290030 A1* | 10/2017 | Wang | H04W 72/0446 |
| 2018/0255569 A1* | 9/2018 | Aiba | H04W 56/00 |
| 2018/0324766 A1* | 11/2018 | Qiu | H04W 72/12 |

FOREIGN PATENT DOCUMENTS

| | | |
|---|---|---|
| CN | 102918793 A | 2/2013 |
| WO | 2010088680 A1 | 8/2010 |

OTHER PUBLICATIONS

LG Electronics Inc., "SPS Implicit Release Counter", 3GPP TSG-RAN2 Meeting #83, Oct. 7, 2013, pp. 1-2, R2-134047, 3GPP, Slovenia.

3rd Generation Partnership Project, "LTE; Evolved Universal Terrestrial Radio Access (E-UTRA); Medium Access Control (MAC) protocol specification", Technical Specification, ETSI TS 136 321 V11.2.0 (3GPP TS 36.321 version 11.2.0 Release 11), Apr. 1, 2013, pp. 1-58, ETSI.

Chinese First Office Action for CN Application No. 201480073955.8, dated Feb. 19, 2019, 11 pages.

* cited by examiner

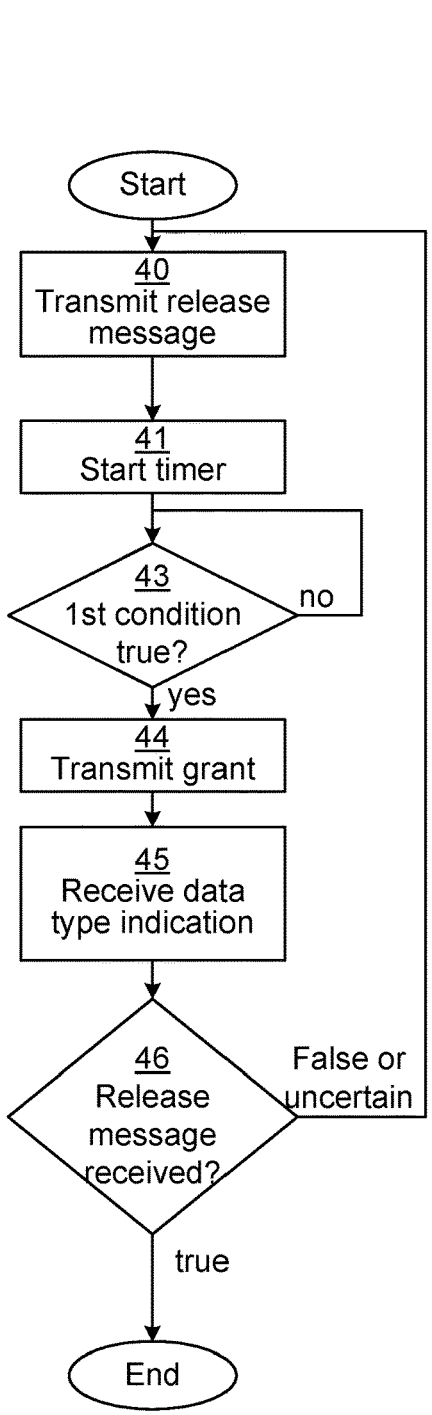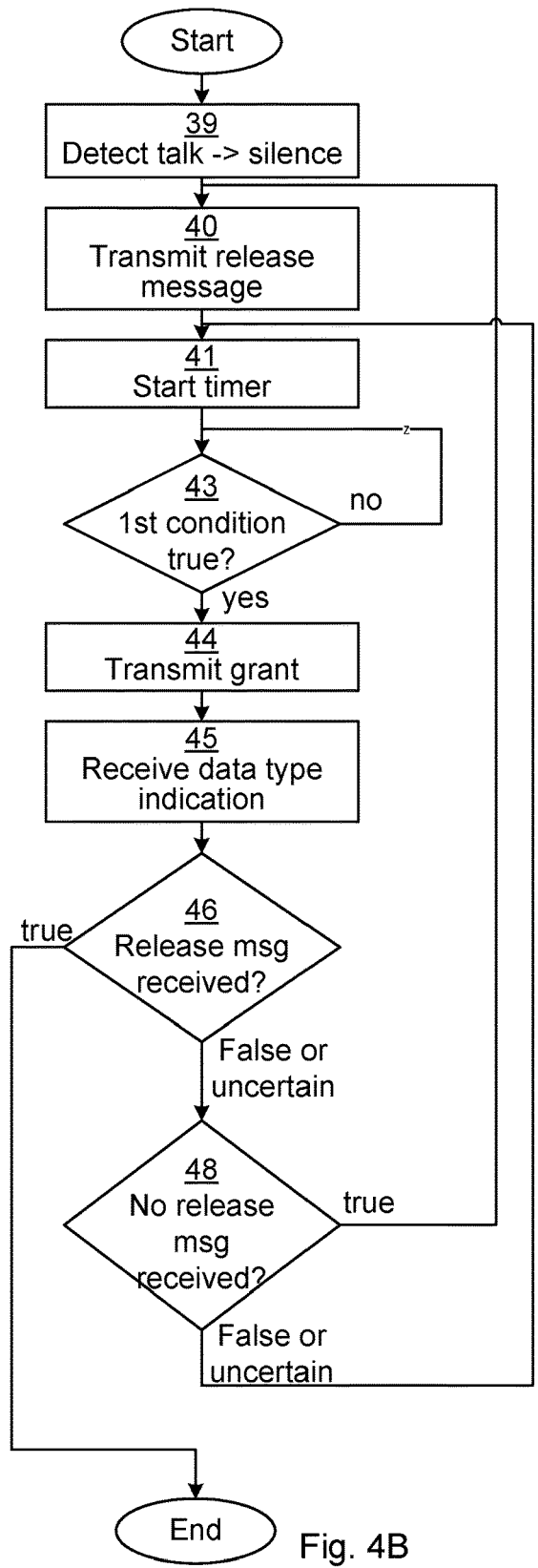
Fig. 4A
Fig. 4B

RELEASE OF SEMI-PERSISTENT SCHEDULING

TECHNICAL FIELD

The invention relates to release semi-persistent scheduling, SPS, for a wireless device, and more specifically, determining when an SPS release message has been correctly received by a wireless device.

BACKGROUND

Cellular communication networks evolve towards higher data rates, as well as improved capacity and coverage. In the 3rd Generation Partnership Project (3GPP) standardization body, several technologies have been and are also currently being developed.

LTE (Long Term Evolution) is a recent standardised technology. It uses an access technology based on OFDM (Orthogonal Frequency Division Multiplexing) for the downlink and SC-FDMA (Single Carrier Frequency Division Multiple Access) for the uplink. The resource allocation to wireless devices (also known as instances of user equipment, UE) on both downlink and uplink is generally performed adaptively using fast scheduling, taking into account the instantaneous traffic pattern and radio propagation characteristics of each wireless device. Assigning resources in both downlink and uplink is performed in the scheduler situated in the radio base station.

However, for periodic low volume traffic, such as for voice (e.g. using VoIP, Voice over Internet Protocol) and other QoS (Quality of Service) applications, such dynamic scheduling consumes a significant amount of overhead in comparison to the payload traffic and prevents some battery conservation methods. In order to reduce this problem, semi-persistent scheduling (SPS) has been introduced to reduce the signaling for periodic traffic.

However, there is an issue when SPS is to be deactivated with a message from the network side to the wireless device. According to the LTE standard, the wireless device should not generate any uplink transmission upon receiving the SPS release message from the network. Hence, there is no known way for the network to know whether the wireless device has correctly received the SPS release message.

This is an issue for the network side, since if the wireless device did not receive the SPS release message, the wireless device is prevented from sending Scheduling Requests (SR) for the logical channels associated with the SPS, e.g. for VoIP. In such a case, the wireless device will not be able to indicate the need for resources when such data is received in its uplink buffer, while the network assumes that the wireless device will send an SR when resources are needed. Such a situation can result in dropped packets, which reduces quality, or even a dropped call.

It is thus evident that any way to improve the ability to determine whether an SPS release message has been successfully received by the wireless device would be a significant improvement over the prior art.

SUMMARY

It is an object to provide a way to determine when an SPS release message has been correctly received by a wireless device without needing to introduce new signalling.

According to a first aspect, it is presented a method for releasing semi-persistent scheduling, SPS, for a wireless device. The method is performed in a network node and comprising the steps of: transmitting an SPS release message to the wireless device to release uplink SPS; starting a timer; when a first condition is true, transmitting a grant for uplink transmission to the wireless device, the first condition being true when the timer expires and/or a scheduling request has been received from the wireless device; receiving a data type indication from the wireless device; and determining that an SPS release message has been correctly received by the wireless device when a scheduling request has been received from the wireless device, the grant has been transmitted and the data type indication indicates only voice over internet protocol, VoIP, data from the wireless device.

Using this method, the network node can, in at least some cases, determine when the SPS release message was correctly received by the wireless device without introducing any new signalling. As explained above, any increase in accuracy of such determination is of great significance. Hence, even if this method is not able to determine conclusively in all cases whether the SPS release message was correctly received or not, it is still of great use.

The data type indication may comprise a buffer status report and/or payload data. In this way, the network node can determine the type of data in the buffer of and/or transmitted from the wireless device.

The method may further comprise the step of: determining that no SPS release message has been correctly received by the wireless device when no scheduling request has been received from the wireless device and the data type indication indicates only VoIP data in.

This provides even better determination of the success (or indeed failure in this case) of the SPS release message, since some failed transmissions can be conclusively determined, also without introducing any new signalling.

When it is determined that no SPS release message has been correctly received, the method may be repeated. In this way, the SPS release is reattempted.

The method may further comprise the step of: returning to the step of starting a timer when a scheduling request has been received from the wireless device and the data type indication indicates not only VoIP data in.

The step of transmitting an SPS release message may be repeated. This provides a better chance of successful transmission of the SPS release message.

The repetition of the transmitting an SPS release message may be performed in parallel to other steps of the method.

The step of transmitting a grant may trigger the wireless device to send the data type indication.

The method may further comprise the step, prior to the step of transmitting an SPS release message, of: detecting that uplink VoIP communication from the wireless device transitions from a talk state to a silence state.

According to a second aspect, it is presented a network node arranged to release semi-persistent scheduling, SPS, for a wireless device. The network node comprises: a processor; and a memory storing instructions that, when executed by the processor, causes the network node to: transmit an SPS release message to the wireless device to release uplink SPS; start a timer; when a first condition is true, transmit a grant for uplink transmission to the wireless device, the first condition being true when the timer expires and/or a scheduling request has been received from the wireless device; receive a data type indication from the wireless device; and determine that an SPS release message has been correctly received by the wireless device when a scheduling request has been received from the wireless device, the grant has been transmitted and the data type indication indicates only voice over internet protocol, VoIP, data from the wireless device.

The Data Type Indication May Comprise a Buffer Status Report and/or Payload Data The network node may further comprise instructions that, when executed by the processor, causes the network node to determine that no SPS release message has been correctly received by the wireless device when no scheduling request has been received from the wireless device and the data type indication indicates only VoIP data in.

The network node may further comprise instructions that, when executed by the processor, causes the network node to repeat the instructions when it is determined that no SPS release message has been correctly received.

The network node may further comprise instructions that, when executed by the processor, causes the network node to return to the instructions to start a timer when a scheduling request has been received from the wireless device and the data type indication indicates not only VoIP data in.

The network node may further comprise instructions that, when executed by the processor, causes the network node to repeat the instructions to transmit an SPS release message.

The instructions to repeatedly transmit an SPS release message may be performed in parallel to other instructions.

The network node may further comprise instructions that, when executed by the processor, causes the network node to detect that uplink VoIP communication from the wireless device transitions from a talk state to a silence state.

According to a third aspect, it is presented a computer program for releasing semi-persistent scheduling, SPS, for a wireless device. The computer program comprises computer program code which, when run on the network node causes the network node to: transmit an SPS release message to the wireless device to release uplink SPS; start a timer; when a first condition is true, transmit a grant for uplink transmission to the wireless device, the first condition being true when the timer expires and/or a scheduling request has been received from the wireless device; receive a data type indication from the wireless device; and determine that an SPS release message has been correctly received by the wireless device when a scheduling request has been received from the wireless device, the grant has been transmitted and the data type indication indicates only voice over internet protocol, VoIP, data from the wireless device.

The Data Type Indication May Comprise a Buffer Status Report and/or Payload Data According to a fourth aspect, it is presented a computer program product comprising a computer program according to the third aspect and a computer readable means on which the computer program is stored.

According to a fifth aspect, it is presented a network node comprising: means for transmitting an SPS release message to a wireless device to release uplink SPS; means for starting a timer; means for, when a first condition is true, transmitting a grant for uplink transmission to the wireless device, the first condition being true when the timer expires and/or a scheduling request has been received from the wireless device; means for receiving a data type indication from the wireless device; and means for determining that an SPS release message has been correctly received by the wireless device when a scheduling request has been received from the wireless device, the grant has been transmitted and the data type indication indicates only voice over internet protocol, VoIP, data from the wireless device.

The Data Type Indication May Comprise a Buffer Status Report and/or Payload Data The network node may further comprise means for determining that no SPS release message has been correctly received by the wireless device when no scheduling request has been received from the wireless device and the data type indication indicates only VoIP data in.

The network node may further comprise means for triggering the means for transmitting an SPS release message when it is determined that no SPS release message has been correctly received.

The network node may further comprise means for triggering the means for starting a timer when a scheduling request has been received from the wireless device and the data type indication indicates not only VoIP data in.

The means for transmitting may be configured to repeating the transmitting of an SPS release message.

The means for transmitting may be arranged to execute in parallel to other means of the network node.

The means for transmitting a grant may trigger the wireless device to send the data type indication.

The network node may further comprise means for detecting that uplink VoIP communication from the wireless device transitions from a talk state to a silence state.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 4A-C are flow charts illustrating embodiments of methods performed in the network node of FIG. 1 for releasing SPS scheduling;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
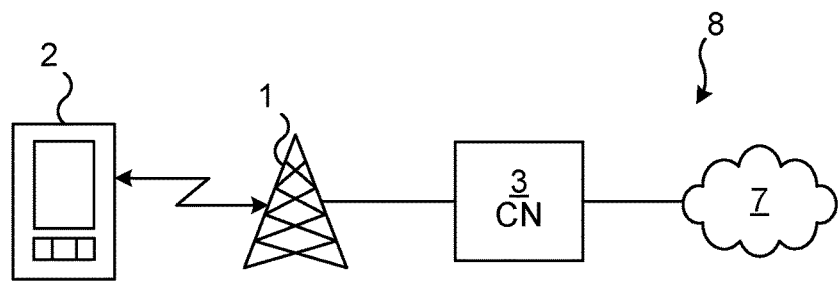
FIG. 1 is a schematic diagram illustrating a cellular network where embodiments presented herein may be applied.

FIG. 1 is a schematic diagram illustrating a cellular network 8 where embodiments presented herein may be applied. The cellular network 8 comprises a core network 3 and one or more network nodes 1, here in the form of radio base stations being evolved Node Bs, also known as eNode Bs or eNBs. The network node 1 could also be in the form of Node Bs, BTSs (Base Transceiver Stations) and/or BSSs (Base Station Subsystems), etc. The network node 1 provides radio connectivity to a plurality of wireless devices 2. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Communication between the wireless device 2 and the network node 1 occurs over a wireless radio interface, where uplink (UL) communication occurs from the wireless device 2 to the network node 1 and downlink (DL) communication occurs from the network node 1 to the wireless device 2. The quality of the wireless radio interface to each wireless device 2 can vary over time and depends on the position of the wireless device 2, due to effects such as fading, interference, multipath propagation, etc.

The network node 1 is also connected to the core network 3 for connectivity to central functions and a wide area network 7, such as the Internet.

Figure 2:
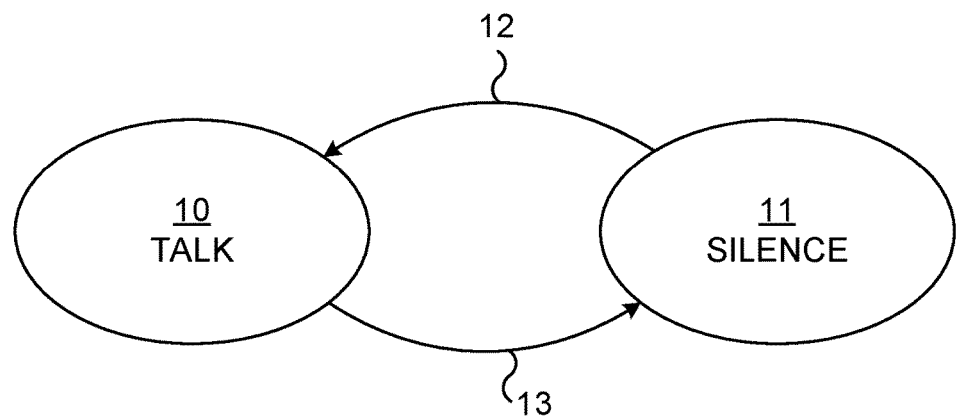
FIG. 2 is a state diagram illustrating states for VoIP for the wireless device of FIG. 1.

FIG. 2 is a state diagram illustrating states for VoIP for the wireless device of FIG. 1. The states are valid separately for the transmitter(s) for either one or both of uplink and downlink. VoIP is used in VoLTE, voice over LTE, whereby traffic is delivered using IP (Internet Protocol). For uplink, the transmitter is in the wireless device.

When voice is encoded by a voice encoder on the transmitter side, the transmitter is in a talk state 10. The speech is then encoded into packets with a typical periodicity of 20 ms. Due to the regularity and relative short periodicity of the talk state 10, it is beneficial for battery consumption of the wireless device not to need to transmit SRs, since this allows better usage of mechanisms such as Discontinuous Reception (DRX). This is achieved by activating uplink SPS for VoIP for the wireless device, by the network node allocating an UL SPS grant to the wireless device.

When there is silence, the transmitter is in a silence state 11. In this state, the voice encoder generates Silence Indication Descriptor (SID) frames that the receiver uses to generate comfort noise. The SID frames have a much longer spacing than the speech frames, 160 ms compared to 20 ms, and are also smaller ~400 bits compared to ~600 bits.

The speech encoders may use voice activity detection in order to identify when there are talk spurts, triggering a transition 12 from the silence state 11 to the talk state 10, and when there is only silence, triggering a transition 13 from the talk state 10 to the silence state.

Contrary to the talk state 10, it is not beneficial to prevent the wireless device from transmitting SRs when in the silence state 11. Therefore, as shown in FIG. 4B and described below, the transition 13 from the talk state to the silence state can be a trigger to release the SPS for the wireless device.

The reason why SPS would not be beneficial in silence state will now be explained. If SPS would be used in silence state 11 (disabling the possibility for the wireless device to send SR) it would be necessary to keep track of the buffer status in the network node. In the silence state 11 the wireless device transmits SID packets once every 160 ms so the network node would update the buffer status with a SID packet once every 160 ms. If the wireless device switches to talk state 10, the wireless device would have to wait on average 80 ms to get a grant. The time budget is 80 ms, so the switch from silence to talk would cause severe packet delay and packet loss. Since the switches between the talk state 10 and silence state 11 occur often, such an issue would be very common.

Figure 3A:
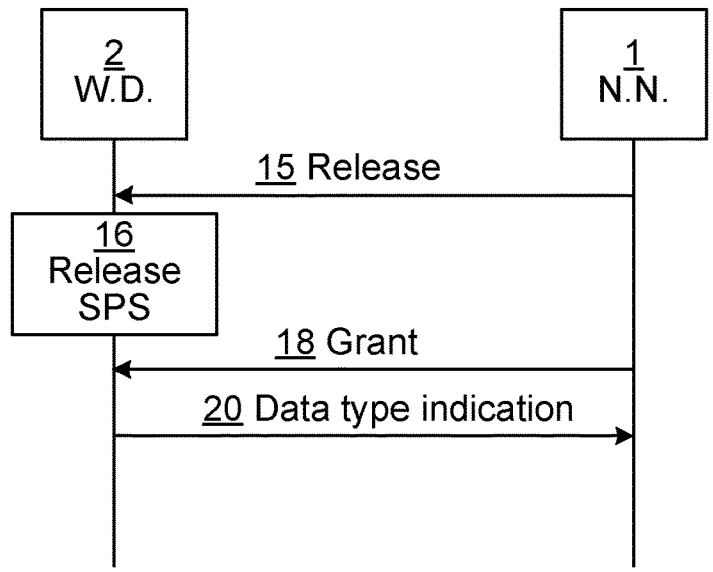
FIG. 3A-B are schematic signalling diagrams illustrating signalling for release of semi-persistent scheduling.
Figure 3B:
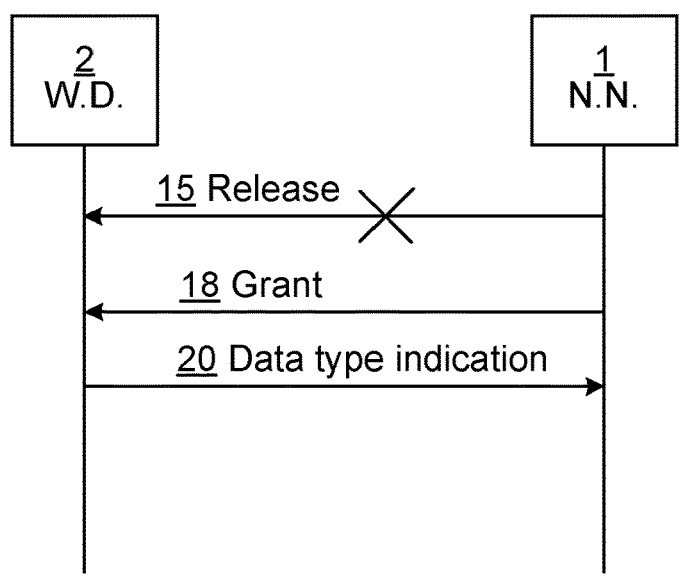

FIG. 3A-B are schematic signalling diagrams illustrating signalling for release of SPS between the network node 1 and the wireless device 2 of FIG. 1.

As explained above, SPS is particularly useful for periodic low volume traffic, such as for voice (e.g. using VoIP). For VoIP, the dynamic scheduling of traditional LTE consumes a significant amount of overhead in comparison to the payload traffic.

The signalling of FIGS. 3A-B occurs between the network node 1 and the wireless device 2. Looking first to FIG. 3A illustrating a successful release of SPS, the network node 1 transmits an SPS release message 15 to the wireless device 2. Upon the correct receipt of the SPS release message 15, the wireless device 16 acts upon this and releases SPS 16 as instructed. At a later stage, the network node 1 sends an uplink grant message 18 to the wireless device 2. The wireless device 2 responds by sending a data type indication 20. The data type indication 20 can include a buffer status report (BSR). Alternatively or additionally, the data type indication 20 includes payload data transmitted at this time if there is any uplink data in the uplink buffer of the wireless device 2.

FIG. 3B is similar to FIG. 3A but instead illustrates a fault scenario. Here, the SPS release request message 15 is not correctly received by the wireless device, indicated by the cross on this message transmission. The reason for the incorrect reception may e.g. be due to non-ideal radio conditions, such as fading, interference, etc. In this case, there is no release of the SPS. Nevertheless, when the uplink grant 18 is transmitted to the wireless device 2, the wireless device responds with the data type indication 20. As explained above, the data type indication 20 can include a BSR and/or payload data.

Figure 4C:
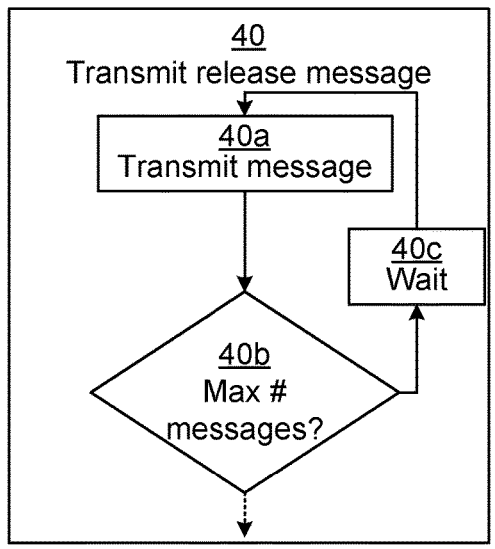

FIGS. 4A-C are flow charts illustrating embodiments of methods performed in the network node of FIG. 1 for releasing SPS. The method is performed for one wireless device and may optionally be performed in parallel for a plurality of wireless devices. First, the method of an embodiment of FIG. 4A will be described.

In a transmit release message step 40, an SPS release message is transmitted to the wireless device to release uplink SPS. The SPS release message can e.g. be PDCCH (Physical Dedicated Control Channel) message as defined in 3GPP TS 36.213 V10.3.0 Table 9.2-1A.

In a start timer step 41, a timer is started.

In a conditional $1^{st}$ condition true step 43, it is determined whether a first condition is true. The first condition is true when the timer expires and/or a scheduling request has been received from the wireless device. When the first condition is true, the method continues to a transmit grant step 44. Otherwise, the method re-executes the conditional $1^{st}$ condition true step, optionally after an idle period (not shown).

In the transmit grant step 44, a grant for uplink transmission is transmitted to the wireless device. The transmission of the grant is performed to trigger the wireless device to send the data type indication buffer status report. One reason for transmitting the grant is to allow the wireless device to transmit uplink data, even if no transmitted SPS release message was correctly received by the wireless device. Optionally, the method waits in order to perform the transmit grant step 44 at a configurable time after the transmit release message step 40.

In a receive data type indication step 45, a data type indication is received from the wireless device. The data type indication can, for instance, include the BSR and/or payload data. The BSR indicates the state of the uplink buffer of the wireless device. The BSR allows the type of data in the buffer, e.g. VoIP data and/or other (not VoIP) data to be identified. The payload data itself can alternatively or additionally be analysed to determine whether there is only VoIP data transmitted and/or other (nor VoIP) data transmitted, by examining headers of the payload data of the actual data using e.g. deep packet inspection. The BSR can be used by itself to determine whether there is only VoIP data. Alternatively, the payload data can be used to determine whether there is only VoIP data, or both the BSR and the payload data can be used to determine whether there is only VoIP data.

In a conditional release message received step 46, it is determined that the SPS release message has been received by the wireless device when a scheduling request has been received from the wireless device and the data type indication indicates only VoIP data from the wireless device. Since, in such a case, there is only VoIP data, it is clear that the VoIP data is the cause of the scheduling request. Moreover, if the SPS release message would not have been received correctly, the wireless device would still be in SPS for uplink VoIP transmissions and would thus refrain from sending any scheduling requests to send the VoIP uplink data. Consequently, the combination of only VoIP data and the presence of the scheduling requests implies that SPS has been released in the wireless device.

Also, it may optionally be verified implicitly or explicitly that the grant has been transmitted to the wireless device in the transmit grant step 44 as a condition to determine that the SPS release message has been received by the wireless device. Implicit verification can e.g. be that the release message received step 46 only executes after a grant has been transmitted, as exemplified in FIG. 4A (and also FIG. 4B). Explicit verification can e.g. be that the grant transmission (either as the grant itself or an indication of the grant) is saved in a memory which can be checked in this step.

If it is determined that the SPS release message has been received, the method ends. Otherwise, the determination of if the release message has been correctly received is uncertain and the method returns to the transmit release message step 40 to send a new SPS release message.

Using this method, the network node can, in at least some cases, determine when the SPS release message was correctly received by the wireless device without introducing any new signalling. As explained above, any increase in accuracy of such determination is of great significance. Hence, even if this method is not able to determine conclusively in all cases whether the SPS release message was correctly received or not, it is still of great use.

FIG. 4B illustrates a method for releasing SPS according to one embodiment. This method is similar to the method illustrated in FIG. 4A, and only new or modified steps, compared to the method of FIG. 4A, will be described.

In an optional detect talk→silence step 39, the network node detects that uplink VoIP communication from the wireless device transitions from a talk state to a silence state (see FIG. 2).

In an optional no release message received step 48, it is determined that no SPS release message has been received when no scheduling request has been received from the wireless device and the data type indication indicates only VoIP data from the wireless device.

If there is VoIP data and SPS is still active, the wireless device refrains from sending any scheduling requests for the VoIP data. But other uplink data is not restricted by SPS, whereby any presence of other (not VoIP) data would cause the wireless device to send a scheduling request. Consequently, the combination of only VoIP data and the absence scheduling requests implies that SPS is still active and thus the SPS release message has not been correctly received in the wireless device.

When it is determined that no SPS release message has been received, the method returns to the transmit release message step 40 to send a new SPS release message. When the result of this step is false, it is unsure whether the SPS release message has been received by the wireless device and the method returns to the start timer step 41.

Taking into account steps 46 and 48, the following truth table can be deduced:

TABLE 1 truth table illustrating the determination of whether the SPS release message has been correctly received by the wireless device

|  | SR received | No SR received |
| --- | --- | --- |
| Only VoIP | True | False |
| Not only VoIP | Uncertain | Uncertain |

In other words, the method returns to the start timer step 41 when the data type indication (e.g. BSR and/or payload data) indicates that there is not only VoIP data from the wireless device or part.

FIG. 4C is a flow chart illustrating details of the transmit release message step 40 of FIGS. 4A-B according to one embodiment.

In a transmit message step 40a, the SPS release message is transmitted to the wireless device.

In a conditional max # of messages step 40b, it is determined whether a maximum number of messages has been transmitted. If this is true, then the transmit release message step 40 ends. Otherwise, the method proceeds to a wait step 40c.

In the wait step 40c, the method waits a certain amount of time. This waiting is performed between successive executions of the transmit message step 40a, creating time diversity of the transmissions of the SPS release messages.

Optionally, the transmit release message step 40 is performed in parallel to the other steps of FIGS. 4A-B.

The time of the wait step 40c and the maximum number of messages of the conditional max # of messages step 40b are parameters which are optionally configurable.

By repeating the transmission of the SPS release message a number of times, the probability for correct decoding of at least one of the SPS release messages is increased.

Figure 5:
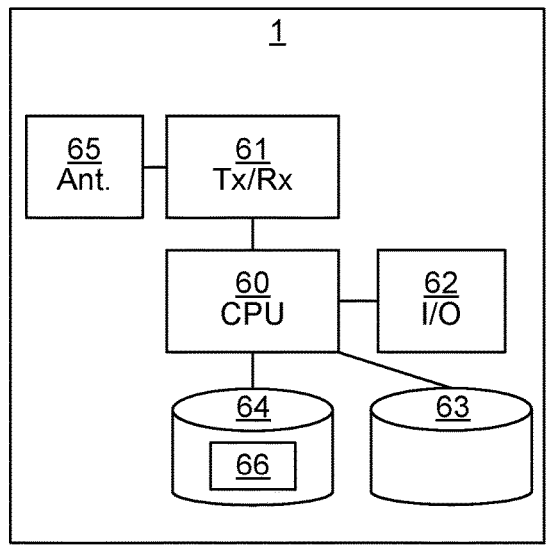
FIG. 5 is a schematic diagram showing some components of the network node of FIG. 1.

FIG. 5 is a schematic diagram showing some components of the network node 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the methods described with reference to FIGS. 4A-C above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM).

The network node 1 further comprises an I/O interface 62 for communicating with other external entities. Optionally, the I/O interface 62 also includes a user interface.

The network node 1 also comprises one or more transceivers 61, comprising analogue and digital components, and a suitable number of antennas 65 for wireless communication with wireless devices as shown in FIG. 1.

Other components of the network node 1 are omitted in order not to obscure the concepts presented herein.

Figure 6:
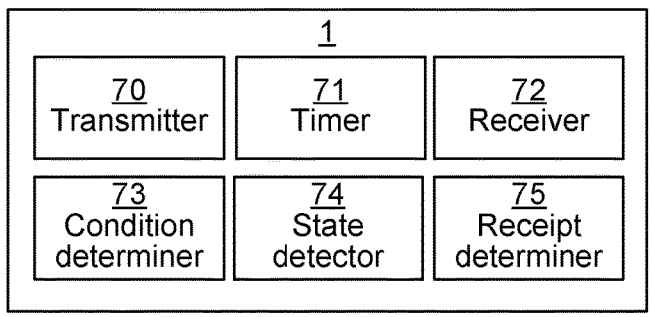
FIG. 6 is a schematic diagram showing functional modules of the network node of FIGS. 1 and 5.

FIG. 6 is a schematic diagram showing functional modules of the network node 1 of FIGS. 1 and 5. The modules can be implemented using software instructions such as a computer program executing in the network node 1 and/or using hardware, such as application specific integrated circuits, field programmable gate arrays, discrete logical components, etc. The modules correspond to the steps in the methods illustrated in FIGS. 4A-C.

A transmitter 70 is arranged to transmit SPS release messages and grants. This module corresponds to the transmit release message step 40 and the transmit grant step 44 of FIGS. 4A-C.

A timer 71 is arranged to keep track of a time to see if it has expired or not. The timer can e.g. be a positive timer, starting at zero and increasing with time to expire when a certain time has passed. Alternatively, the timer can be a negative timer, starting at a certain time and decreasing with time to expire when it reaches zero. This module corresponds to the start timer step 41 of FIGS. 4A-B.

A receiver 72 is arranged to receive the data type indication from the wireless device. This module corresponds to the receive data type indication step 45 of FIGS. 4A-B.

A condition determiner 73 is arranged to determine whether the first condition is true. This module corresponds to the conditional 1$^{st}$ condition true step 43 of FIGS. 4A-B.

A state detector 74 is arranged to detect the VoIP state of the wireless device in question. This module corresponds to the detect talk→silence step 39 of FIG. 4B.

A receipt determiner 75 is arranged to determine whether the SPS release message was received by the wireless device. This module corresponds to the release message received step 46 of FIGS. 4A-B and the no release message received step 48 of FIG. 4B.

Figure 7:
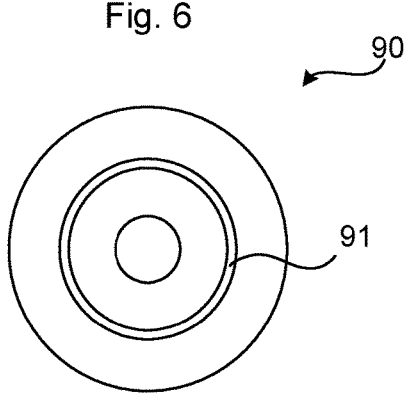
FIG. 7 shows one example of a computer program product comprising computer readable means.

FIG. 7 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for releasing semi-persistent scheduling (SPS) for a wireless device, the method being performed in a network node and comprising:
   transmitting an SPS release message to the wireless device to release uplink SPS;
   starting a timer;
   when a first condition is true, transmitting a grant for uplink transmission to the wireless device, the first condition being true when at least one of the timer expires and a scheduling request has been received from the wireless device;
   receiving a data type indication from the wireless device;
   determining that an SPS release message has been correctly received by the wireless device when the scheduling request has been received from the wireless device, the grant has been transmitted, and the data type indication indicates only voice over internet protocol (VoIP) data from the wireless device; and
   retransmitting the SPS release message; wherein repetition of the transmitting the SPS release message is performed in parallel to transmitting the SPS release message, starting the timer, transmitting the grant for uplink transmission to the wireless device, receiving the data type indication from the wireless device, and determining that the SPS release message has been correctly received by the wireless device.

2. The method according to claim 1, wherein the data type indication comprises a buffer status report.

3. The method according to claim 1, wherein the data type indication comprises payload data.

4. The method according to claim 1, further comprising determining that no SPS release message has been correctly received by the wireless device when no scheduling request has been received from the wireless device and the data type indication indicates only VoIP data from the wireless device.

5. The method according to claim 4, wherein the method is repeated when it is determined that no SPS release message has been correctly received.

6. The method according to claim 1, further comprising re-starting the timer when the scheduling request has been received from the wireless device and the data type indication indicates data other than just VoIP data from the wireless device.

7. The method according to claim 1, wherein transmitting the grant triggers the wireless device to send the data type indication.

8. The method according to claim 1, further comprising detecting that uplink VoIP communication from the wireless device transitions from a talk state to a silence state prior to transmitting the SPS release message.

9. A network node arranged to release semi-persistent scheduling (SPS) for a wireless device, the network node comprising:

a processing circuit; and a memory circuit to store instructions that, when executed by the processing circuit, causes the network node to:

transmit an SPS release message to the wireless device to release uplink SPS;

start a timer;

when a first condition is true, transmit a grant for uplink transmission to the wireless device, the first condition being true when at least one of the timer expires and a scheduling request has been received from the wireless device;

receive a data type indication from the wireless device;

determine that an SPS release message has been correctly received by the wireless device when the scheduling request has been received from the wireless device, the grant has been transmitted, and the data type indication indicates only voice over internet protocol (VoIP) data; and retransmit the SPS release message; wherein repetition of the transmitting the SPS release message is performed in parallel to transmitting the SPS release message, starting the timer, transmitting the grant for uplink transmission to the wireless device, receiving the data type indication from the wireless device, and determining that the SPS release message has been correctly received by the wireless device.

10. The network node according to claim 9, wherein the data type indication comprises a buffer status report.

11. The network node according to claim 9, wherein the data type indication comprises payload data.

12. The network node according to claim 9, further comprising instructions that, when executed by the processing circuit, causes the network node to determine that no SPS release message has been correctly received by the wireless device when no scheduling request has been received from the wireless device and the data type indication indicates only VoIP data from the wireless device.

13. The network node according to claim 12, further comprising instructions that, when executed by the processing circuit, causes the network node to repeat the instructions when it is determined that no SPS release message has been correctly received.

14. The network node according to claim 9, further comprising instructions that, when executed by the processing circuit, causes the network node to return to the instructions to start the timer when the scheduling request has been received from the wireless device and the data type indication indicates data other than just VoIP data from the wireless device.

15. The network node according to claim 9, further comprising instructions that, when executed by the processing circuit, causes the network node to repeat the instructions to transmit an SPS release message.

16. The network node according to claim 15, wherein the instructions to repeatedly transmit an SPS release message are performed in parallel to other instructions.

17. The network node according to claim 9, further comprising instructions that, when executed by the processing circuit, causes the network node to detect that uplink VoIP communication from the wireless device transitions from a talk state to a silence state.

18. A non-transitory computer readable medium storing a computer program product for releasing semi-persistent scheduling (SPS) for a wireless device, the computer program product comprising software instructions that, when executed by processing circuitry of a network node, causes the network node to:

transmit an SPS release message to the wireless device to release uplink SPS;

start a timer;

when a first condition is true, transmit a grant for uplink transmission to the wireless device, the first condition being true when at least one of the timer expires and a scheduling request has been received from the wireless device;

receive a data type indication from the wireless device; and determine that an SPS release message has been correctly received by the wireless device when the scheduling request has been received from the wireless device, the grant has been transmitted, and the data type indication indicates only voice over Internet protocol (VoIP) data; and retransmit the SPS release message: wherein repetition of the transmitting the SPS release message is performed in parallel to transmitting the SPS release message, starting the timer, transmitting the grant for uplink transmission to the wireless device, receiving the data type indication from the wireless device, and determining that the SPS release message has been correctly received by the wireless device.

* * * * *